UNITED STATES PATENT OFFICE.

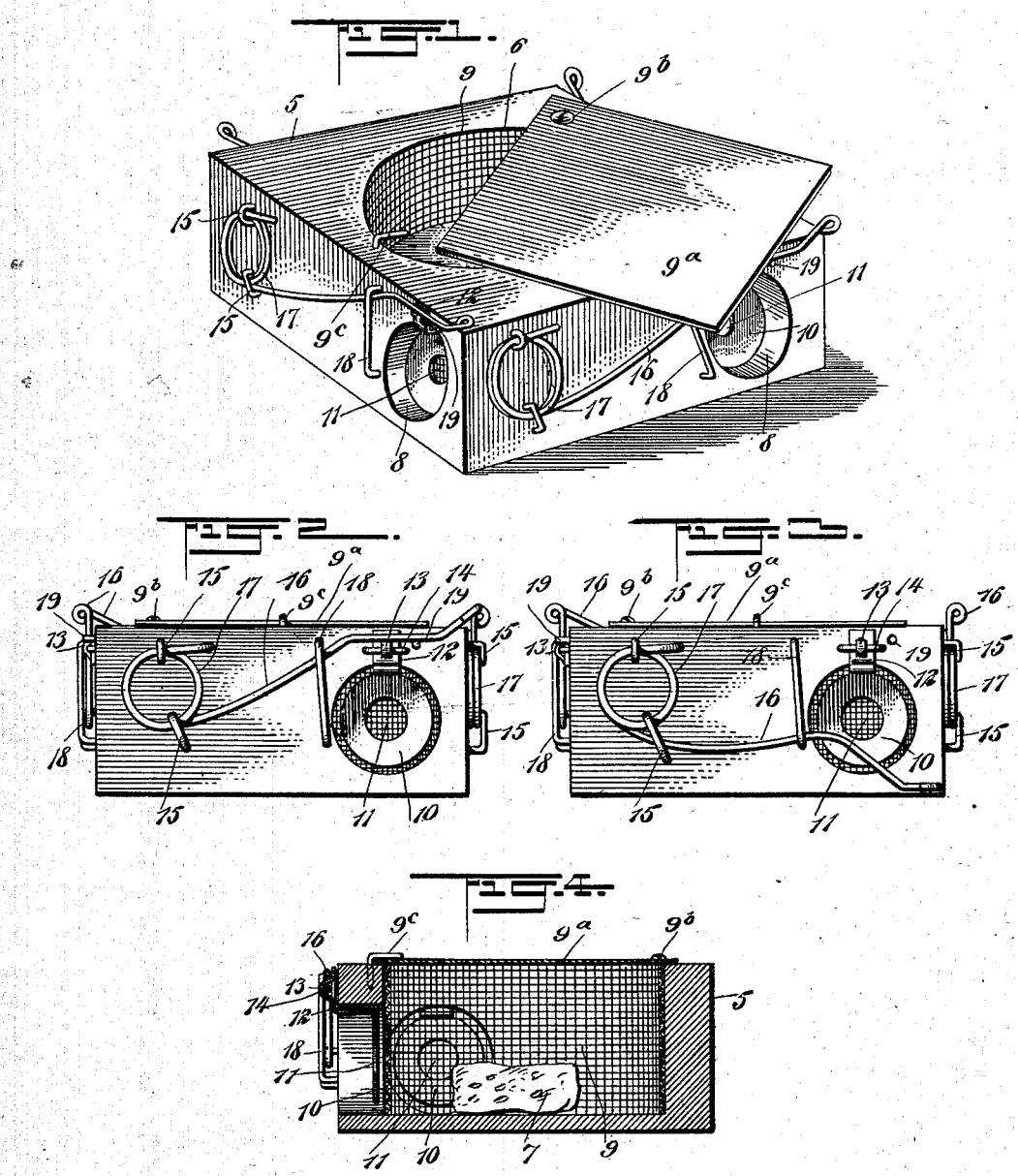

RAPHAEL CHASSÉ, OF NEW YORK, N. Y.

MOUSE-TRAP.

SPECIFICATION forming part of Letters Patent No. 714,281, dated November 25, 1902.

Application filed June 23, 1902. Serial No. 112,727. (No model.)

*To all whom it may concern:*

Be it known that I, RAPHAEL CHASSÉ, a citizen of the United States, and a resident of New York, borough of Manhattan, in the county of New York and State of New York, have made and invented certain new and useful Improvements in Mouse-Traps, of which the following is a specification.

My invention relates to an improvement in mouse-traps, the object of the same being to provide a device of this character which shall be simple and economical to manufacture and effective and certain in its operations; and with these and other ends in view it consists in certain novel features of construction and combinations of parts, as will be hereinafter fully described, and pointed out in the claims.

In the accompanying drawings, Figure 1 is a view in perspective of my improved trap. Fig. 2 is a side view of the same in its set position. Fig. 3 is a similar view after the same has been sprung, and Fig. 4 a vertical sectional view thereof.

Referring to the drawings, 5 represents the block or base, preferably made of wood and provided with a central well or receptacle 6 for containing the bait 7 and into which lead the openings or entrances 8, said well or receptacle being lined with wire netting or gauze 9 to prevent entrance thereto and the removal of the bait and protected by a suitable cover 9ª, pivoted at 9ᵇ and adapted to be held in its closed position by the catch 9ᶜ.

In the drawings I have illustrated the base or block as being provided with four sides and with trapping devices arranged on each of said sides; but I would have it understood that one side only may be provided with such devices, and, again, if desired, the device may be formed with six or more sides and each provided with said devices. As the construction and arrangement of parts, however, is exactly similar on all sides I will describe those as attached to one side only.

In the entrance or opening 8 is hung the plate 10, provided with the central opening 11 and with the curved or bent arm 12, the latter being cut or slit and the portion 13 thereof forced outwardly, forming a loop through which passes the staple 14, the ends thereof being driven into the wooden block or base 5 and by means of which the said plate 10 is pivoted or movably secured in place. To the base or block 5 is also secured by means of the staples or fasteners 15 the arm 16, preferably formed of wire and having one end coiled, as shown at 17, to form a spring therefor, the tendency of which latter is to keep the arm 16 in its lowered position, as illustrated in Fig. 3, a staple or loop 18 being secured to the block or base and in proximity to the entrance or opening 8 for guiding the free end of said arm 16 in its vertical movements.

To the base or block 5 and to one side of the tripping-arm 12 is secured a pin 19, upon which the free end of the arm 16 rests when the trap is set, as illustrated in Figs. 1 and 2, said arm 16 passing in front of and in contact with said tripping-arm.

In attempting to secure the bait the mouse attempts to enter the opening 8 and in so doing slightly forces inward the pivoted plate 10, the result being that the tripping-arm 12, formed thereon, is slightly forced outwardly, carrying with it the spring-actuated arm 16 until the latter is disengaged from the pin 19, upon which it rests. By reason of the tension of the spring 17 the arm 16 will be incidentally carried downwardly, tightly holding the mouse between said arm 16 and the bottom of the entrance.

I am aware that a trap has heretofore been constructed having an opening therein and provided with a pivoted door or plate and with a tripping-arm upon which the spring-actuated wire rod rests, and hence I make no claim to such; but, Having fully described my invention, what I claim as new, and desire to secure by Letters Patent, is—

1. A trap consisting of a base or block provided with a central well or receptacle, and with an entrance or opening leading thereto from the side of said base, of a plate suspended within said opening and provided with a tripping-arm pivoted to the side of said base, a spring-actuated arm secured to said base, a pin upon which the free end of said spring-actuated arm rests when the trap is set, said arm being held in front of and in contact with said tripping-arm, substantially as described.

2. A trap of the character described, consisting of a base provided with a central well or receptacle and with a plurality of sides, each side having a hole or entrance leading to said receptacle, of trapping devices secured to each of said sides and consisting of a plate suspended within the entrance and provided with a tripping-arm pivoted to said base, a supporting-pin and an arm coiled into a spring at one end and secured to said base, the opposite end being free and supported on said pin in front of said tripping-arm when the trap is set, and means for guiding said arm in its vertical movements, and a wire screen within said well or receptacle for preventing access thereto through said opening or entrances, substantially as described.

Signed at New York, borough of Manhattan, in the county of New York and State of New York, this 20th day of June, A. D. 1902.

RAPHAEL CHASSÉ.

Witnesses:
   M. VAN NORTWICK,
   GEORGE COOK.